United States Patent [19]

Hoke et al.

[11] Patent Number: 4,551,792

[45] Date of Patent: Nov. 5, 1985

[54] EXTERIOR POST TOP MOUNTING LIGHTING FIXTURE

[75] Inventors: Merle C. Hoke; Richard G. Armstrong, both of Newark; James E. Penn, Lockbourne, all of Ohio

[73] Assignee: Manville Service Corp., Denver, Colo.

[21] Appl. No.: 533,326

[22] Filed: Sep. 16, 1983

[51] Int. Cl.[4] .............................................. B60Q 3/04

[52] U.S. Cl. .................................... 362/362; 362/311; 362/367; 362/455

[58] Field of Search ................ 362/362, 311, 367, 455

[56] References Cited

U.S. PATENT DOCUMENTS 3,365,571 1/1968 Koziol ................................ 362/367

*Primary Examiner*—Stephen J. Lechert, Jr.

*Attorney, Agent, or Firm*—John D. Lister; Cornelius P. Quinn

[57] ABSTRACT

An improved exterior post top mounted lighting fixture with a housing formed by four extruded right-angled aluminum members interlocked together, the housing providing means for aligning an electrical assembly and the components thereof in a predetermined position.

7 Claims, 8 Drawing Figures

EXTERIOR POST TOP MOUNTING LIGHTING FIXTURE

This invention relates to an improved lighting fixture for exterior post top mounting.

Post top luminires are ideal for lighting parking areas of shopping centers, office buildings, churches, pathways, entrances and general area lighting aroung commercial, institutional and multi-unit residential buildings.

It is an object of the present invention to provide a post top luminaire employing and extruded assembly for a housing which is also adapted to receive and position the electrical components of the luminaire.

It is another object of the present invention to provide an extruded housing providing means for positioning at total electrical assembly, including a ballast, capacitor, starter, socket, and electrical disconnect.

It is another object of the present invention to provide a lighting fixture with an electrical assembly including a ballast, capacitor, starter socket and electrical disconnect totally removable as a unit in the field for replacement and/or repair.

SUMMARY OF THE INVENTION

Accordingly, the present invention provides an exterior post top mounted lighting fixture with a housing formed by four extruded right-angled aluminum members interlocked together, a removable electrical assembly on which all the electrical components are mounted, and the housing providing means for positioning the electrical assembly in a predetermined position.

DETAILED DESCRIPTION OF THE INVENTION

Figure 1:
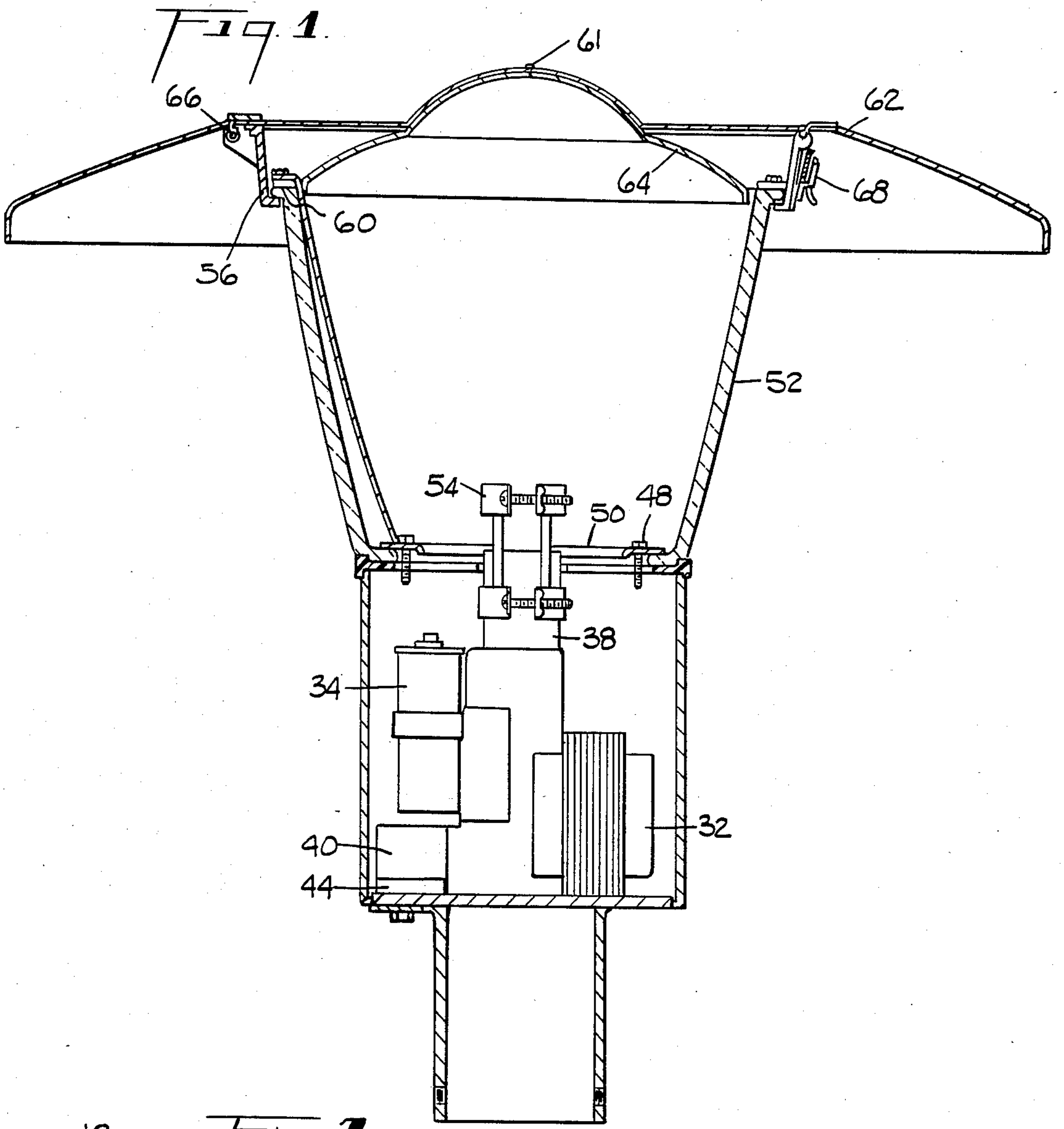
FIG. 1 is a front, partially broken away view of an assembled light fixture embodying the present invention.

Referring now to the drawings, in FIG. 1 there is shown a front partially broken away view of an exterior post top mounting lighting fixture in accordance with the present invention.

Figure 2:
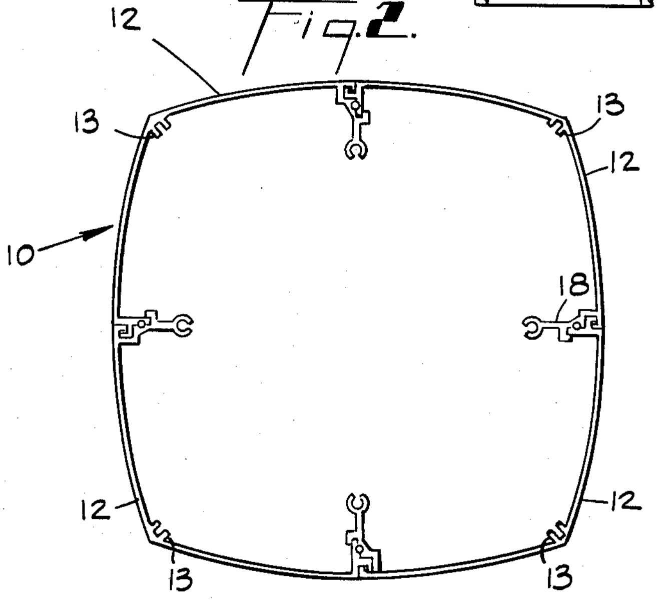
FIG. 2 is a bottom view of four identical, extruded aluminum pieces slid together to form a housing in accordance with the invention.
Figure 3:
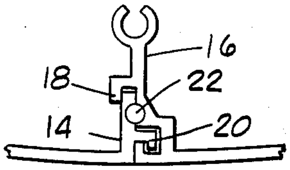
FIG. 3 is an exploded view of a portion of FIG. 2 illustrating the manner in which the extruded aluminum pieces interlock with each other.
Figure 6:
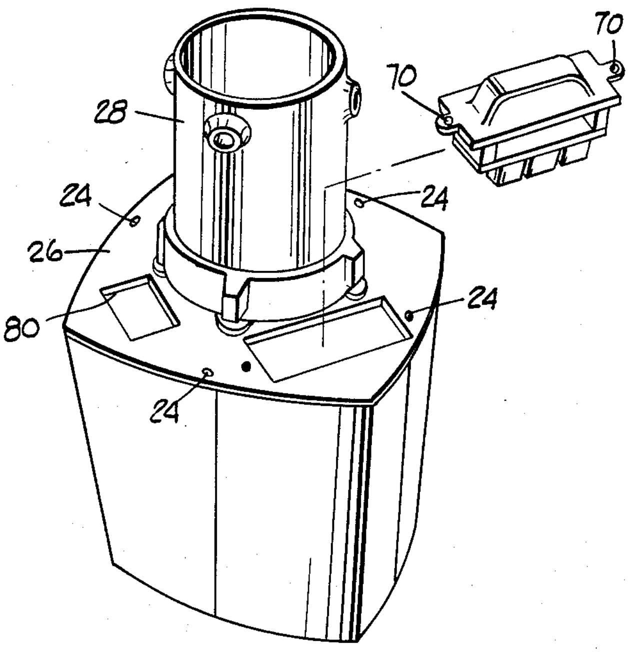
FIG. 6 is a bottom perspective view of the housing showing a terminal block being removed from the housing.

The lighting fixture has a housing generally identified by the reference numeral 10. The housing 10 as best shown by FIG. 2 is made up of four identical aluminum right-angled extruded members 12 slid together. A pair of longitudinal ribs 13 in each of the corners formed by the right-angle of the extruded members 12 provide the extruded members with rigidity and strength. As illustrated in the exploded view in FIG. 3, each of the extruded members 12 has elongated protrusions 14 and 16 with mating tabs 18 and 20 which interlock and hold the extruded members 12 together. With the protrusions 14 and 16 interlocked together, a hole 22 is formed between them for receiving a screw 24 shown in FIG. 6 which expands the interlock and holds the four right-angled extrusion members 12 from sliding. The same screws 24 as shown in FIG. 6 also fasten the extruded housing assembly 10 onto a mounting plate 26 which in turn is connected to a pole slipfitter 28.

Figure 5:
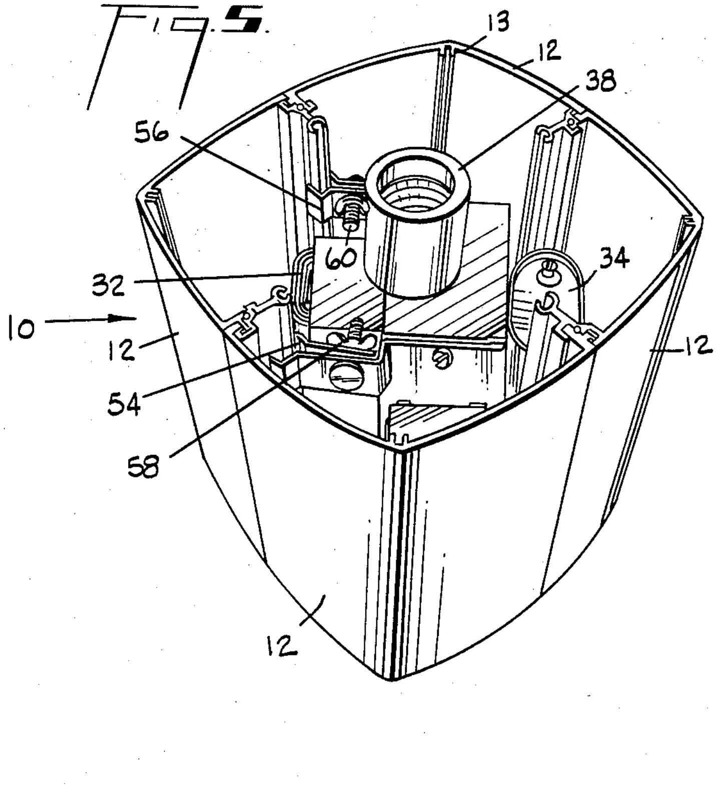
FIG. 5 is a perspective view of the housing shown in FIG. 4 with one embodiment of an electrical assembly mounted therein.
Figure 7:
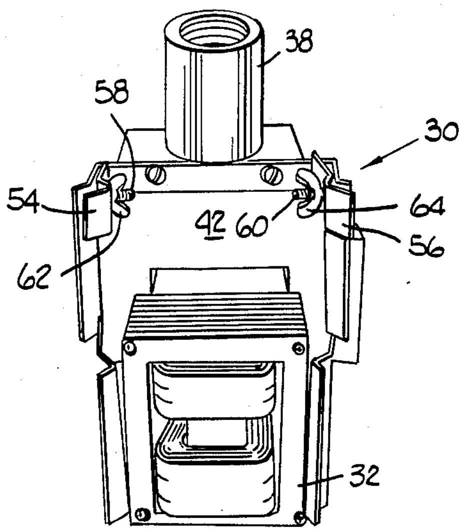
FIG. 7 is a perspective view of an embodiment of an electrical assembly in accordance with the invention
Figure 8:
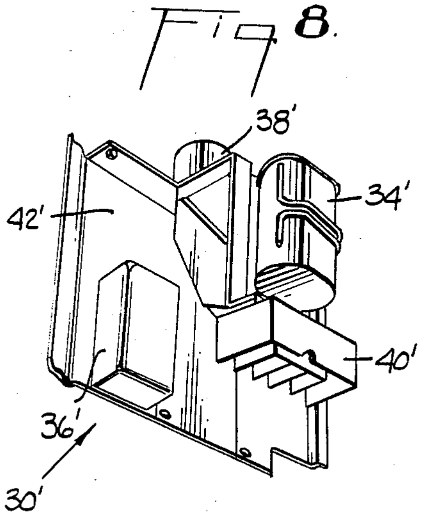
FIG. 8 is a perspective view of an alternative embodiment of an electrical assembly in accordance with the invention.

Referring now to FIGS. 7 and 8, there is shown electrical assemblies generally identified by the reference numeral 30 and 30'. Both the electrical assembly 30 and the electrical assembly 30' include a ballast, a capacitor, a starter, a socket and an electrical disconnect member, all of which are mounted on a mounting plate assembly. The components of the electrical assembly 30 which is also shown in FIG. 5 as well as FIG. 7, are identified as follows: the ballast-32, the lamp socket-38, the capacitor-34, the mounting plate-42. The components of the electrical assembly 30' illustrated in FIG. 8 are as follows: the lamp socket-38', the capacitor-34', the starter-36', the electrical disconnect member-40' and a mounting plate-42'. The only difference between electrical assembly 30 and the electrical assembly 30' is the mounting plates and the manner in which the respective mounting plate is positioned within the housing 10 as will be discussed in more detail hereafter.

Figure 4:
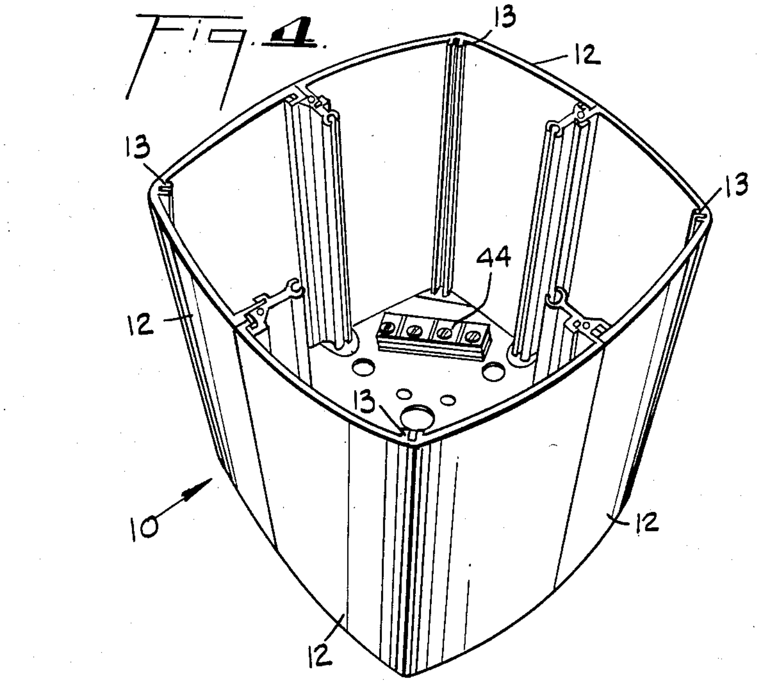
FIG. 4 is a perspective view of the housing shown in FIG. 1 showing a terminal block mounted therein.

As illustrated in FIG. 4, a terminal plate 44 is provided at the bottom of the housing for engaging electrical disconnect member 40 or 40'.

As shown in FIG. 2, each of the protrusions 16 of the four right angled extruded members 12 has a slotted ball portion 46 extending therefrom. The slotted ball portions 46 are not only adopted to receive screws 48 protruding through a top plate 50 for the purpose of holding a glass refractor 52 in place as shown in FIG. 1, but as shown in FIG. 5 they are also used to position the electrical assembly 30 whereby a predetermined proper socket 38 and a proper light center position is provided. A pair of clamps 54 and 56 extending from the mounting plate assembly 42 engage a pair of the slotted ball portions 46 and are fixed thereto by a pair of bolts 58 and 60 having wing nuts 62 and 64 respectively for tightening the clamps 54 and 56 to the slotted ball portions 46.

In the other embodiment of the electrical assembly 30' illustrated in FIG. 8, instead of having pair of clamps, the edges of the mounting plate assembly 42' are adapted to slide into a pair of the extended slotted balls 46 thereby positioning the electrical assembly 30' so that a predetermined proper position for socket 38' and a proper light center position is provided.

As illustrated in FIG. 1 a lamp grip or support 54 is provided for supporting a lamp (not shown) in the socket 38 and a collar 56 fastened to a lip 60 of the refractor 52 is provided for supporting a canopy 62.

Fastened to the canopy 62 by a screw 61 is a reflector 64. The canopy 62 is pivotally mounted on the collar 56 by a hinge 66 and secured to the collar 56 by a latch 68.

The terminal plate is removed from the housing 10 by loosening a pair of screws 70 which fasten the terminal plate 44 to the housing 12. The terminal plate 44 can then be removed from the housing 12 and from the disconnect plate 40 disconnecting power from the electrical asembly 30 and thereby permitting replacement of fuses which may be mounted either in the terminal block 44 or the disconnect plate 40. To conveniently relamp the fixture, the canopy 62 of the fixture can then be pivotedly opened to remove and replace a lamp (not shown).

Also, the total electrical assembly 30 can be removed in one piece for replacement or repair and when it is replaced, automatically achieve proper socket and light positioning.

As illustrated in FIG. 6, an opening 80 is provided for mounting a photocell connected to the electrical assembly for automatically controlling the operation of the lamp if so desired.

While the invention has been particularly shown and described in reference to preferred embodiments thereof, it will be understood by those skilled in the art that various changes of form and details may be made therein without departing from the spirit and scope of the invention.

What is claimed is:

1. A light fixture for exterior post top mounting having a housing comprising four identical right-angled extruded aluminum members with interlocking joints for holding each other to form a solid rigid housing.

2. A light fixture as defined in claim 1 including an electrical assembly having a mounting plate on which electrical components are attached, and means in said housing for aligning said mounting plate and said electrical components in a predetermined position.

3. A light fixture as defined in claim 2 wherein said means for aligning said mounting plate includes protrusions formed on said right-angled extruded aluminum members.

4. A light fixture as defined in wherein said housing has a bottom plate on said housing with an access opening provided therin for removing a terminal block and disconnecting a power source from said light fixture.

5. A light fixture as defined in claim 4 wherein the removal of said terminal block also provides access for the removal and replacement of fuses.

6. A light fixture as defined in claim 5 wherein said lamp fixrue includes a pivotedly mounted canopy for providing necessary access for removal and replacement of a lamp in a lamp socket.

7. A light fixture as defined in claim 6 wherein said electrical assembly may be removed and replaced as a single unit.

* * * * *